United States Patent

[11] 3,597,832

| [72] | Inventors | Marion R. Calton<br>East Peoria;<br>Calvin D. Loyd, Peoria, both of, Ill. |
|---|---|---|
| [21] | Appl. No. | 796,425 |
| [22] | Filed | Feb. 4, 1969 |
| [45] | Patented | Aug. 10, 1971 |
| [73] | Assignee | Caterpillar Tractor Co.<br>Peoria, Ill. |

[54] INERTIA WELDING OF STEEL TO ALUMINUM
9 Claims, 1 Drawing Fig.

[52] U.S. Cl. .................................................. 29/470.3
[51] Int. Cl. .................................................. B23k 27/00
[50] Field of Search .................................... 29/470.3;
228/2; 156/73

[56] References Cited

UNITED STATES PATENTS

| 3,175,284 | 3/1965 | Cotovsky | 29/470.3 |
| 3,269,001 | 8/1966 | Hollander | 29/470.3 |
| 3,273,233 | 9/1966 | Oberle et al. | 29/470.3 |
| 3,460,235 | 8/1969 | Roberts et al. | 29/470.3 |
| 3,468,732 | 9/1969 | Hewitt | 29/470.3 X |
| 3,477,116 | 11/1969 | Calton et al. | 29/470.3 |

FOREIGN PATENTS

| 963,681 | 7/1960 | Great Britain | 29/470.3 |
| 963,683 | 7/1960 | Great Britain | 228/2 |

OTHER REFERENCES

" Friction Welding," Abstract of article published in Czechoslovak Heavy Industry , No. 8, 1960, in Machinery , Vol. 97, Oct. 19, 1960, pp. 892— 896.

*Primary Examiner*—John F. Campbell
*Assistant Examiner*—Ronald J. Shore
*Attorney*—Fryer, Tjensvold, Feix, Phillips & Lempio ABSTRACT: A process for inertia welding of steel to aluminum which may include the steps of cleaning and/or etching the parts, providing conical projections on the parts, providing a step load cycle wherein the final thrust load is high and close to the yield strength of the aluminum, utilizing moderately high speeds, the exercising close control of the alignment, amount of stickout, rigidity, and the triggering speed for the final load.

Patented Aug. 10, 1971 3,597,832
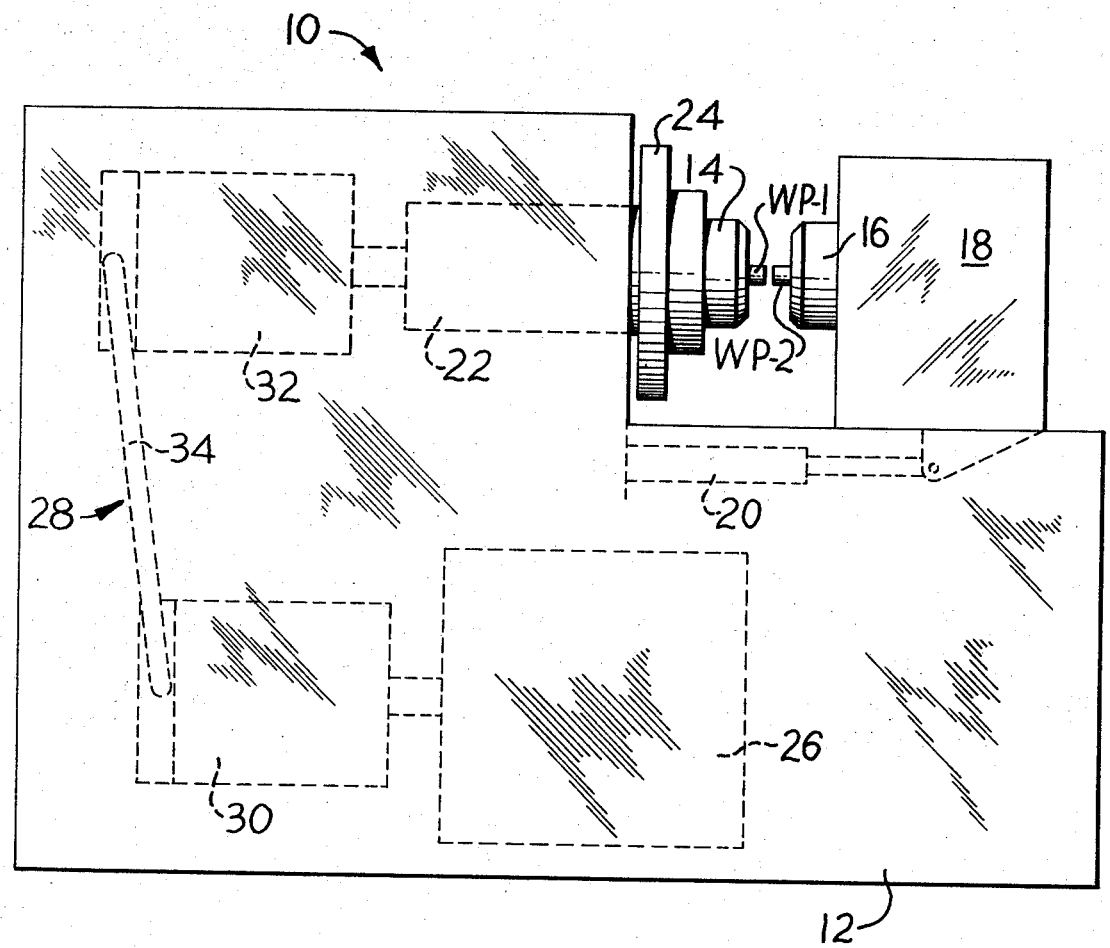
INVENTORS
MARION R. CALTON
CALVIN D. LOYD
BY
ATTORNEYS

INERTIA WELDING OF STEEL TO ALUMINUM

SUMMARY OF THE INVENTION

This invention relates to a method of joining steel and aluminum workpieces by the inertia welding process, and more specifically to such a process in which the specific parameters and procedures for making acceptable welds are controlled.

Inertia welding has developed into an attractive and advantageous method for joining metals. This is partly due to the fact that a large number of metals, materials, and combinations of metals and materials are weldable by the inertia welding process. The list of weldable metals is almost limitless and includes almost all steels, a large number of pure metal, the oxide dispersion-strengthened alloys, and combinations of steels, pure metal, and the oxide-strengthened materials.

However, one of the most difficult combinations has proven to be steel and aluminum, since it is extremely difficult to get a satisfactory weld through the use of the previous technology. On the other hand, successful welding of steel to aluminum would have a great deal of use in commercial applications and for that reason, has been one of the most sought after metal combinations for welding by the inertia welding process. Since the very early days of inertia welding, attempts at joining steel to aluminum have been made and a great deal of experimentation and trial and error has been employed to determine correct and procedures and welding parameters to join these materials successfully.

The difficulty with welding these two materials rests in the widely different thermal and mechanical properties of steel and aluminum. Along this line, some of the more important properties that make the joining of these materials difficult are the difference in their melting points, the difference in their thermal conductivity, and the tendency of the two materials to form hard, brittle compounds when joined. In inertia welding, the low melting temperature of the aluminum limits the interface temperatures to values below the forging temperature of the steel and consequently prevents any plastic deformation in the steel at the interface.

Experimentation and investigation of the welding of these materials have continued almost from the discovery of inertia welding to the present time. Many different procedures and a wide range of welding parameters have been attempted in striving to attain good welds between the steel and aluminum workpieces. However, almost all welds utilizing known technology were considered poor because they exhibited very little fatigue, impact, or bend strength.

It is therefore an object of this invention to provide a method for inertia welding steel to aluminum.

It is also an object of this invention to provide such a method producing improved welds between such materials.

It is also an object of this invention to provide such a method wherein welds formed between such materials exhibit good fatigue, impact and bend strengths.

It is further object of this invention to provide such a system which may be carried out on presently available machines.

Other objects and advantages of the present invention will become apparent from the following description and claims as illustrated in the accompanying drawing which, by way of illustration, shows a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing form the present invention and purview of the appended claims.

BRIEF DESCRIPTION OF THE DRAWING

The FIGURE shown in the drawing is a side elevation illustrating one embodiment of a friction or inertia welding machine which may be utilized to practice the method of the present invention.

DETAILED DESCRIPTION OF THE DRAWING

A friction welding machine constructed so as to produce the weld described herein is indicated generally by the reference numeral 10 in the FIGURE. As shown, the machine comprises a frame or housing structure generally denoted at 12 for housing the various element of the machine. The two workpieces to be welded, WP-1 and WP-2, are mounted within chucks 14 and 16.

The chuck 16 does not rotate and is mounted on a tailstock fixture 18. The fixture 18 is mounted for axial movement of the machine frame 12 under the control of a load cylinder 20. A pressure control circuit (not shown) regulates the pressure in a load cylinder, and thus determines the axial force with which the workpieces are engaged.

The chuck 14 is mounted on a spindle 22 and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission indicated generally by the reference numeral 28. The transmission includes a hydrostatic pump 30, a hydrostatic motor 32, and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam of the pump 30 to a position in which the pump does not displace any hydraulic fluid to the motor 32.

It is to be understood that the flywheel weights 24 are mounted on the spindle 22 so that the welding machines 10 can be operated in the manner described in U.S. Pat. No. 3,273,233 and as described in further detail below.

A welding operation to join a first workpiece to a second workpiece can be performed by operating the machine in the following general manner.

One of the workpieces, WP-1, is firmly clamped in the rotatable chuck 14 located on the spindle 22. The other workpiece WP-2 is firmly clamped in the nonrotatable chuck 16 which is located on the tailstock portion 18 of the machine. Upon actuation of the motor 26, he flywheel and workpiece WP-1 are accelerated to a predetermined velocity.

Once this velocity has been obtained, the motor 26 is disconnected or shut down and the ram mechanism 20 is actuated to move tailstock portion 18 and workpiece WP-2 axially into contact with the rapidly rotating workpiece WP-1, As the two workpieces are brought into contact under the pressure applied through ram 20, heat is generated at the contacting surface or interface of the weld piece. This heating increases until the workpieces reach the weld temperature, at which time the pressure, applied by the ram 20, causes flashing or upsetting to occur. During this heating and flashing, the rotational velocity of the spindle 22 continues to decrease. At the time the rotation of the spindle ceases, upsetting has taken place and the weld is completed.

Although the above-described use of the machine is that of inertia welding, it is not intended to limit this invention to an inertia welding process only, but rather to include the processes of friction welding as described in "Friction Welding of Materials" by V.I. Vill, published by American Welding Society, Inc., New York, Library of Congress Catalog Card Number 62-13420.

Experimental programs directed toward the successful welding of steel to aluminum have continued through the years, but, until the present discovery was made, such welds have had very little fatigue, impact, or tensile strength. This is important, since the strength of a weld has been the most important criteria for determining whether a weld was good or bad.

In the present invention, it has been discovered that when certain techniques for the handling of the workpieces to be welded are adhered to, assuming of course that suitable parameters are utilized, highly satisfactory welds between steel and aluminum can be obtained.

With respect to the techniques which must be utilized, a conical projection should be provided on the aluminum weld surface when that weld piece is a solid member. The conical projection produces a greater amount of heat at the center of the steel workpiece. This is necessary since the speed of rotation at the center of the workpieces, which is not as great as that at the outer edges of the workpieces, tends to be insufficient for satisfactorily heating the center of the steel workpiece. This central heating is necessary to eliminate entrapment of oxides and debris in the weld and to insure that all impurities are flushed out from between the pieces and a good weld is accomplished across the entire interface. The conical projection causes a heating of the steel workpiece to commence at the center thereof, with subsequent radial distribution, both by conduction through the steel and also by friction with the aluminum as the conical projection wears down.

Next, thorough cleaning of the weld surfaces by either mechanical or chemical means, or both, must be accomplished. For example, chemical cleaning by means of etching with various acids may be used. Aluminum and aluminum alloys may be etched with hydrofluoric acid (HF). Stainless steels may be etched with concentrated hydrochloric acid (HCl), or a mixture of nitric acid ($HNO_3$), hydrochloric acid (HCl), and hydrofluoric acid (HF). Carbon alloy steels may be etched electrolytically in a bath of sulfuric acid ($H_2SO_4$) and phosphoric acid ($H_3PO_4$).

When performing a weld it is necessary to provide a two-step load cycle with the initial step being of low value, and the final step being of a high value and applied very near the end of the cycle, for example, between 500 and 100 r.p.m. The first, low-pressure, step serves to maintain rotation at the steel-aluminum interface without producing seizure, but allowing both materials to become heated.

After a predetermined period for rotation at the initial thrust load, which takes place at moderately high speed, a high final thrust load which is near the yield strength of the aluminum material is used. It has been estimated that this high final thrust load should be somewhere between 66 and 95 percent of the yield strength value of the aluminum material. The high final thrust load, while producing seizure between the workpieces, prevents formation of excessive amounts of undesirable intermetallic compounds.

Of course, it is also important that very close control of the alignment, amount of stickout past the chucks, and the rigidity of the weld pieces be very closely controlled and also that the triggering speed for the application of the final load be very accurately measured.

Although it is difficult to define a parameter range, for all aluminums and all steels, when welding pure aluminum or a 6061 aluminum alloy to a stainless or low-to-medium carbon alloy steel, the following parameter range may be utilized:

| | |
|---|---|
| Surface velocity: | 200—1600 feet per minute |
| Thrust load: | Initial—800—2,000 lbs. Final—20,000—40,000 lbs. |
| Energy: | 3,000—32,000 ft.-lbs./in.$^2$ |

Using the procedures previously outlined for welding a one inch diameter bar of 6061 aluminum alloy and 302 stainless steel for example, a typical weld cycle for the welding of steel to aluminum would be as follows:

The 1-inch diameter aluminum weld piece is provided with a small center conical projection, most probably by machining, and the steel weld surface is machined smooth. Immediately prior to welding, the weld faces of both specimens are thoroughly cleaned, although it is far more important that the steel workpiece be cleaned and, if necessary the aluminum workpiece could be left uncleaned. In performing the cleaning, the stainless steel piece can be etched in a mixture of nitric acid ($HNO_3$), hydrochloric acid (HCl), and hydrofluoric (HF). IF possible, the aluminum sample would be etched in a hydrofluoric (HF) bath.

After etching, the pieces are than clamped in the rotatable and nonrotatable chucks, 14 and 16, respectively, of the inertia welding machine 10. It is not important which piece is clamped in which of the fixtures. The alignment, stickout, and rigidity of both workpieces should be carefully controlled.

The correct welding parameters are then set on the machine for the weld cycle. For this particular application, a one inch diameter bar, the rotating speed of the spindle and coupled flywheel would be about 5,500 r.p.m. (1,435 feet per minute) and the flywheel inertial mass would be about 4.46 lb.-ft.$^2$). The amount of energy available from such a mass at that speed would be 23,500 ft.-lb. (30,000 ft.-lb./in.$^2$). The thrust load to be applied would initially be 1,000 lbs. (1,275 p.s.i.), and the final thrust load would be 29,000 lbs. (37,000 p.s.i.).

When the weld pieces have been securely chucked in the clamping fixtures so as to provide good rigidity during the weld cycle and so clamped as to provide a small amount of stickout, and the proper settings have been made on the welding machine, the spindle and flywheel masses are set in motion to accelerate to the required velocity. When the spindle and flywheel mass have reached the correct welding velocity (5,500 r.p.m.), power to the spindle is discontinued and at the same time the initial, low value, thrust load is applied to the machine to bring the weld pieces together. As the weld pieces come into contact under the initial thrust load, the energy of the rotating flywheel and spindle is converted to heat by means of friction at the interface of the weld pieces which are then heated to the welding temperature. This heating continues as the flywheel mass slows and, when the spindle and mass is at a speed between 500 and 100 r.p.m. the final thrust load is applied to the weld pieces. Shortly thereafter, the machine will come to a stop and the weld will be completed. The clamping chucks or fixtures may then be released, the thrust load relaxed, and the completed weld assembly removed from the machine.

Welds which were performed in accordance with the above example have been found to possess excellent bonding characteristics and, when placed in tension, have failed out of the weld at stresses at about 46,000 p.s.i.

Thus the Applicants have disclosed an improved method for welding steel and aluminum which produces heretofore unobtainable strength in the welded workpieces. While illustrated and described with respect to a certain machine utilizing specific techniques and parameters, the invention is capable of variation or modification within the purview of the following claims in such ways as will be obvious to those skilled in the art.

We claim:

1. A process for welding a solid aluminum bar to a solid steel bar across a common interface comprising the steps of providing a conical projection at the center of the aluminum weld surface, cleaning the steel weld surface, the engaging the bars in rotating rubbing contact at a speed high enough to produce welding heat at the interface, pressing the bars together with an initial axial load low enough to avoid seizure and high enough to produce the welding heat, and then increasing the axial load to a level just below the yield strength of the aluminum bar to prevent the formation of intermetallic compounds.

2. The process of claim 1 wherein said step of cleaning the steel weld surface comprises the steps selecting an acid from a group of acids consisting of concentrated hydrochloric and hydrofluoric acids, and a mixture of sulfuric and phosphoric acids, and etching the steel weld surface in the selected acid.

3. The process of claim 1 including the step of cleaning the aluminum weld surface.

4. The process of claim 3 wherein the step of cleaning the aluminum weld surface comprises the step of etching the surface in hydrofluoric acid.

5. The process of claim 1 wherein the application of the final thrust load is accomplished prior to the cessation of relative rotation.

6. A process of welding a solid aluminum bar to a solid steel bar comprising the steps of cleaning the steel interface surface, providing a conical projection at the center of the aluminum weld surface, rapidly rotation said bars relative to one another at a relative speed in excess of 200 surface feet per minute, forcing said bars together with an initial force of 1,020—2,550 p.s.i., and then further forcing said bars together with a force of 25,500—51,000 p.s.i. to prevent the formation of intermetallic compounds.

7. The process of claim 6 including the step of cleaning the weld surface of the aluminum bar prior to relatively rotating the bars.

8. The process of claim 7 wherein the step of cleaning the aluminum weld surface includes etching the surface with acid.

9. The process of claim 6 wherein said step of further forcing said bars together is performed as the relative rotational speed is decreasing and is at a speed of 500 to 100 r.p.m.